United States Patent
Snyder, II

(10) Patent No.: US 9,306,916 B2
(45) Date of Patent: Apr. 5, 2016

(54) SYSTEM AND A METHOD FOR A REMOTE DIRECT MEMORY ACCESS OVER CONVERGED ETHERNET

(71) Applicant: Cavium, Inc., San Jose, CA (US)

(72) Inventor: Wilson Parkhurst Snyder, II, Holliston, MA (US)

(73) Assignee: CAVIUM, INC., San Jose, CA (US)

( * ) Notice: Subject to any disclaimer, the term of this patent is extended or adjusted under 35 U.S.C. 154(b) by 168 days.

(21) Appl. No.: 14/140,488

(22) Filed: Dec. 25, 2013

(65) Prior Publication Data

US 2015/0178242 A1 Jun. 25, 2015

(51) Int. Cl.
*H04L 29/06* (2006.01)
*G06F 9/455* (2006.01)
*H04L 12/931* (2013.01)

(52) U.S. Cl.
CPC ........ *H04L 63/0428* (2013.01); *G06F 9/45533* (2013.01); *H04L 49/70* (2013.01)

(58) Field of Classification Search
CPC ......... G06F 21/44; G06F 21/85; G06F 21/50; G06F 21/6218; G06F 9/45533; H04L 63/20; H04L 63/0428; H04L 9/3236; H04L 49/70
USPC ....................................................... 713/150
See application file for complete search history.

(56) References Cited

U.S. PATENT DOCUMENTS

| | | | | |
|---|---|---|---|---|
| 5,586,253 A * | 12/1996 | Green et al. | | 714/53 |
| 6,594,712 B1 * | 7/2003 | Pettey et al. | | 710/22 |
| 7,010,607 B1 * | 3/2006 | Bunton | | H04L 1/24 709/228 |
| 7,913,077 B2 * | 3/2011 | Ko | | H04L 63/1466 709/227 |
| 8,396,981 B1 * | 3/2013 | Lee | | H04L 12/4625 709/203 |
| 8,935,508 B1 * | 1/2015 | Ardhanari et al. | | 711/216 |
| 2002/0059451 A1 * | 5/2002 | Haviv | | 709/238 |
| 2003/0046505 A1 * | 3/2003 | Craddock et al. | | 711/165 |
| 2003/0051076 A1 * | 3/2003 | Webber | | 710/6 |
| 2003/0188178 A1 * | 10/2003 | Strongin et al. | | 713/193 |
| 2004/0024833 A1 * | 2/2004 | Siddabathuni | | G06F 13/28 709/212 |
| 2005/0177712 A1 * | 8/2005 | Kadi | | H04W 28/14 713/150 |
| 2008/0244017 A1 * | 10/2008 | Gershinsky et al. | | 709/206 |
| 2010/0064070 A1 * | 3/2010 | Yoshimura | | G06F 13/128 710/22 |
| 2011/0083064 A1 * | 4/2011 | Kagan | | H04L 63/123 714/807 |
| 2012/0331065 A1 * | 12/2012 | Aho | | G06F 15/17731 709/206 |
| 2013/0332557 A1 * | 12/2013 | Fox | | G06F 15/167 709/212 |
| 2014/0096145 A1 * | 4/2014 | Aingaran | | G06F 17/30501 719/314 |
| 2015/0012606 A1 * | 1/2015 | Gadipudi | | H04L 47/193 709/212 |
| 2015/0026419 A1 * | 1/2015 | Stevens | | G06F 9/4555 711/153 |

* cited by examiner

*Primary Examiner* — Hadi Armouche
*Assistant Examiner* — Shahriar Zarrineh
(74) *Attorney, Agent, or Firm* — pkalousek.ip

(57) ABSTRACT

A method and a system embodying the method for receiving a remote direct memory access packet comprising an opaque data, a virtual address, and a payload at a virtual network interface card that generated the opaque data; reconstructing a stream identifier by separating the opaque data into an encrypted stream identifier and a first digest; decrypting the encrypted stream identifier; verifying the decrypted stream identifier using the first digest; providing the verified stream identifier to a system memory management unit; and mapping the virtual address and the provided stream identifier by the system memory management unit to a physical address, is disclosed.

12 Claims, 4 Drawing Sheets

SYSTEM AND A METHOD FOR A REMOTE DIRECT MEMORY ACCESS OVER CONVERGED ETHERNET

BACKGROUND

1. Field

The present disclosure relates to communications in computer networks. More particularly, this invention is directed toward a Remote Direct Memory Access (RDMA) over Converged Ethernet (RoCE).

2. Description of Related Technology

In computer systems, virtualization is a process by which a virtual version of computing resources, such as hardware and software resources, i.e., a central processor unit, a storage resources, an input/output resources, a network resource, an operating system, and other resources known in the art, are simulated by a computer system, referred to as a host machine. A typical host machine may comprise a hardware platform that optionally together with a software entity i.e., an operating system, operates a hypervisor, which is software or firmware that creates and operates virtual machines, also referred to as guest machines. Through hardware virtualization, the hypervisor provides each virtual machine with a virtual hardware operating platform. By interfacing with the virtual hardware operating platform, the virtual machines access the computing resources of the host machine to execute virtual machines' respective operations. As a result, a single host machine can support multiple virtual machines, each operating an operating system and/or other software entity, i.e., an application, simultaneously through virtualization.

In a typical host machine, the virtual hardware operating platform should be presented to the virtual machines in a manner that assures that the virtual nature of the hardware platform should not be discernible to the virtual machines. Consequently, the host machine should avoid conflicts between virtual machines in accessing the computing resources. To accomplish these goals, the host machine may implement a translation scheme between the virtual machines' software and the host machine's resources. With regard to accessing network resources, for example, the host machine may support virtual network interface that are presented to respective virtual machines. The virtual network interface Virtual Network Interface Card (VNIC) appears to the virtual machine as a physical Network Interface Card (NIC). However, the host machine translates between the VNIC and the NIC. As a result, the host machine can manage the network resources for multiple virtual machines.

RDMA allows one (local) machine to place information directly into the memory of another (remote) machine, without involving processor, cache, or operating system of either machine. RDMA thus allows user space applications to directly access hardware and zero-copy data movement. The RDMA address translation and an optional corruption protection is implemented in a NIC. Part of implementing RDMA via different standards, e.g., the Internet Wide Area RDMA Protocol (iWARP), RDMA over Converged Ethernet (RoCE), in virtualized environment, is to insure that data transfer from one entity, e.g., an application, cannot corrupt another entity, e.g., another application. Additionally, the virtual address space of each application may be different; consequently, an address translation between the virtual address space of the applications and the physical address space is needed also potentially causing corruption.

A System Memory Management Unit (SMMU), an entity communicatively communicating with the virtual address space and the physical memory space, handles the address translation and corruption protection. A structure within the SMMU defines mapping of a stream identifier and virtual address to allowed address regions of the physical memory. The term stream indicates flow of information between an entity receiving the information, e.g., the NIC or VNIC and the physical memory.

In some implementations, the stream identifier comprises a data field, e.g., a remote key (R_Key) provided in an RDMA packet, e.g., a RoCE packet. However, such an implementation is undesirable due to, e.g., potential forgery attacks; furthermore, random creation of the R_Key may result in a valid stream identifier, but not belonging to a VNIC selected to process the RoCE packet, as well as for other disadvantages known to a person of ordinary skills in the art. Consequently, an improved implementation utilizes the R_Key together with another entity, e.g., a partition key (P_Key), also provided in the RoCE packet, as entries to a look-up table, the contents of which yields the stream identifier. The look-up table thus provides means of ascertaining the RoCE RDMA permitted regions of the physical memory; therefore, preventing data corruption. The latter implementation is disadvantageous at least for the reason that a specific hardware structure implementing the look-up table must be built into a network interface, i.e., the NIC, resulting in increased area and increased power required for the NIC.

The size of the hardware structure implementing the look-up table is especially significant if the NIC, while designed to process both Transmission Control Protocol (TCP) and RoCE style packets is being used to process only TCP style packets, because a memory used for the loop-up table implementing the R_Key and P_Key translation to stream identifier for the RoCE style packets would not be used; thus consuming area and power for no benefit.

Accordingly, there is a need in the art for an implementation of virtual network interface for Remote Direct Memory Access over Converged Ethernet providing solution to the above identified problems, as well as additional advantages.

SUMMARY

In one aspect of the disclosure, an apparatus and a method for remote direct memory access according to appended independent claims is disclosed. Additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

Figure 1:
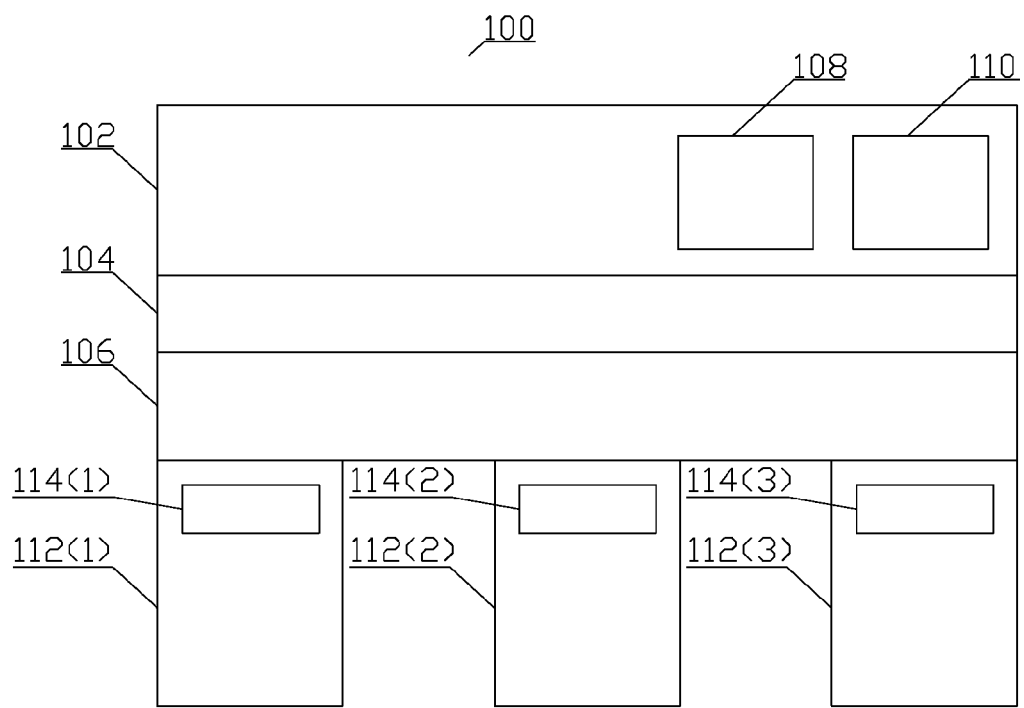
FIG. 1 depicts a conceptual structure of a virtualization system in accordance with an aspect of this disclosure.
Figure 2:
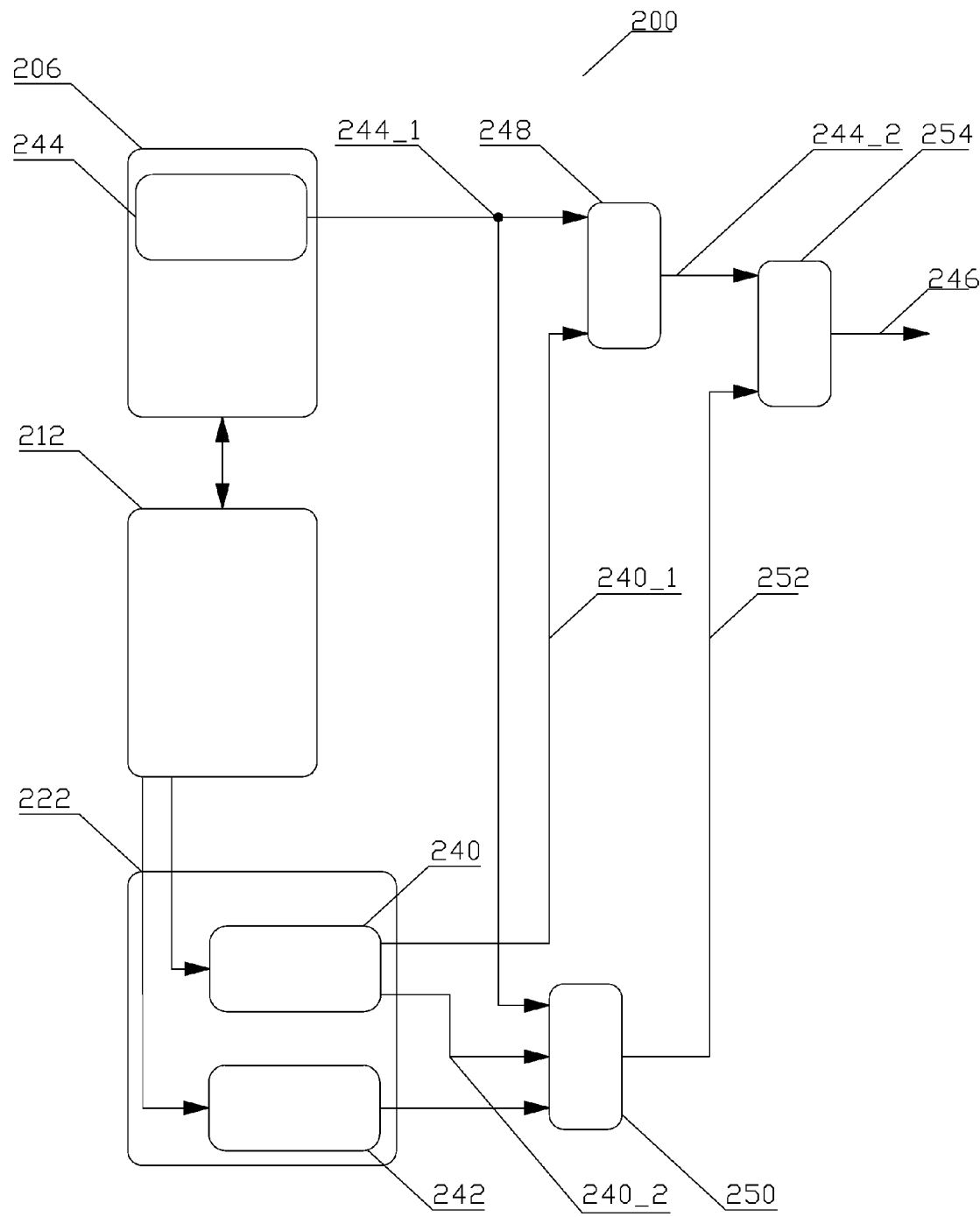
FIG. 2 depicts a conceptual structure and information flow enabling deterministic generation of an opaque data comprising a stream identifier.

The description of like structural elements among the figures is not repeated, the like elements have reference numerals differing by an integer multiple of 100, i.e., reference numeral 102 in FIG. 1, becomes reference numeral 202 in FIG. 2; unless differences and/or alternative aspects are explicitly noted. Any unreferenced double-arrow line indicates a possible information flow between the depicted entities.

DETAILED DESCRIPTION

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

Various aspects of the present invention will be described herein with reference to drawings that are schematic illustrations of conceptual configurations of the present invention, unless explicitly noted. The various aspects of this disclosure are provided to enable one of ordinary skill in the art to practice the present invention. Modifications to various aspects of a presented throughout this disclosure will be readily apparent to those skilled in the art, and the concepts disclosed herein may be extended to other applications.

FIG. 1 depicts a conceptual structure of a virtualization system 100 in accordance with an aspect of this disclosure. A hardware platform 102 together with an optional software entity 104, i.e., operating system, comprises a host machine operating a Type 2, also known as hosted, hypervisor 106. As well known to a person of ordinary skills in the art, the optional software entity 104 is not necessary for Type 1 hypervisors, also known as native hypervisors. The aspects of the disclosure are equally applicable to both types of the hypervisor.

The hardware platform 102, comprises all physical entities embodying computing resources required by a specific host machine, i.e., a central processor unit, an input/output resources, a storage resource, a network resource, and other resources known to a person skilled in the art. To avoid undue complexity, only a storage 108, and a network resource 110 are shown. The storage resource 108, may comprise a hard drive based memory, a semiconductor based memory, and other types of memory known in the art. Throughout the disclosure the terms storage and memory are, therefore, used interchangeably. The network resource 110 comprises at least one NIC.

The hypervisor 106 creates and operates at least one virtual machine 112. Although three virtual machines 112 are shown, a person skilled in the art would understand that any number, including a single virtual machine, may exist. Parameters configuring operation of the virtual machine 112 are defined via structure 114. In one aspect, the structure 114 may comprise at least one register.

As suggested supra, a stream identifier indicates allowed address regions of the physical memory for a virtual address. Considering the remote key (R_Key), i.e., a key generated in accordance with the Infiniband specification for control of memory access, it is noted that the R_Key is an opaque, arbitrary, but unique entity. Therefore, the R_Key may be generated in a deterministic manner, thus avoiding the disadvantages of randomly generated R-Key. Furthermore, the R_Key may be generated in a manner enabling verification that the R_Key was not tampered with. Consequently, the R_Key, or a part thereof, may be used directly as a stream identifier without the disadvantages noted supra.

Such approach does not necessitate changes to the existing standard, does not add any overhead, and, unlike the known implementations, both an address translation between the virtual address provided in the RoCE packet and the physical address space in the storage 108, and the assurance that such a translation will not result in corruption, may be carried out by a System Memory Management Unit (SMMU), thus eliminating the need for a look-up table.

Referring now to FIG. 2, a structure and information flow 200 enabling the process of generating an R_Key is described. A hypervisor 206 with input from a virtual machine 212 generates a stream identifier 244. The stream identifier 244 identifies memory region (not shown) and access controls permitted to be accessed by a data fields of a RoCE packet containing the stream identifier 244. The stream identifier 244, is then stored at the hypervisor 206, and is never visible to the other entities at the local machine, e.g., the virtual machine 212, an application (not shown).

The size of the stream identifier 244 is determined by the implementation of a SMMU (not shown), the need to keep the stream identifier 244 secure, and the need to verify that the generated R_Key was not tampered with. In one aspect, the SMMU may require a stream identifier size smaller than the size of the R-Key, which, according to the Infiniband specification is standardized at 32 bits; consequently, the size of the stream identifier equal to the size required by the SMMU may be used, subject to the condition that the difference between the size of the R-Key and the size of the stream identifier allows for sufficient size of a digest used to verify the size of the stream identifier. Otherwise, the stream identifier may need to be divided as disclosed infra.

In another aspect, the SMMU may require a stream identifier size greater than or equal to the size of the R-Key, e.g., a stream identifier size 64 bits. Consequently, the stream identifier 244 is divided into a static part (not shown) and a programmable part 244_1.

To avoid unnecessary complexity and repeatability, the following discloses the latter aspect as a more involved one. However, a person of ordinary skills in the art will understand that readily apparent modification would merely treat the entire stream indicator as the programmable part.

The size of the programmable part 244_1 is determined so that the programmable part 244_1 is secure from cryptographic attack and, additionally, with the requirement that a size of a digest, used for verification that the generated R_Key was not tampered with, together with the size of the programmable part 244_1 are less than or equal to the size of the R_Key. The static part of the stream identifier 244 is then set to a different value for each VNIC, thus guaranteeing uniqueness of each of the stream identifier 244.

The protection from cryptographic attack is achieved by encrypting the programmable part 244_1 with a randomly generated secret key. The verification of non tampering is achieved by cryptographic hash of the programmable part 244_1. The cryptographic hash generates a digest such that any, accidental or intentional, change to the programmable part 244_1 changes the digest. Furthermore, a cryptographic hash takes as an input an arbitrary sized block of data and generates a fixed-size digest. Consequently, the size of the programmable part 244_1 and the size of the digest may be optimized as known to persons of ordinary skills in the art.

The hypervisor 206 via a virtual machine 212 configures a VNIC 222 with a randomly generated secret 240. To protect the secret 240, the secret 240 is known only to certain entities. In one aspect, the secret is known only to the hypervisor 206; in another aspect the secret is known to the hypervisor 206, the virtual machine 212, the NIC (not shown), and the VNIC 222. The secret 240, or a part thereof, is used for encryption of the programmable part 244_1 of the stream identifier 244. Furthermore, the secret 240 may be also used for verification of non tampering.

Although in one aspect, the cryptographic hash is applied only the programmable part 244_1 of the stream identifier 244, in another aspect the cryptographic hash is applied to the programmable part 244_1 of the stream identifier 244 and at least one additional random data to improve the resistance of the generated digest against cryptographic attacks. The at least one additional random data may comprise the secret 240 or a part thereof.

As depicted, the secret 240 is separated into two secret data parts, a secret key 240_1, used for encryption of the programmable part 244_1 of the stream identifier 244, and an entropy 240_2, optionally used as the at least one additional random data for the cryptographic hash. The separation assures that one part cannot be derived from the other, thus further improving the security. However, a person skilled in the art will understand that alternatively two independent random data may be generated. The size of the two parts is selected in accordance with the implementation and the need to keep the secret from cryptographic attack. The virtual machine 212 or the hypervisor 206 further generates a 16-bit P_Key 242, as specified by the Infiniband specification, and stores the P_Key at an application (not shown), the virtual machine 212, or the hypervisor 206. The P_Key 242 is eventually included in an RoCE packet and is recovered and used by the remote machine receiving the RoCE packet.

When, during a formation of the RoCE packet, an R_Key 246 is required, the hypervisor 206 first encrypts the programmable part 244_1 of the stream identifier 244 with the secret key 240_1 using a function 248 to provide an encrypted stream identifier 244_2; consequently, the encrypted stream identifier 244_2 is no longer easily predictable. In one aspect, the size of the secret key 240_1 is selected to be equal to the size of the programmable part 244_1 of the stream identifier 244 and the function 248 comprises a modular addition, implemented as, e.g., an XOR function. However, any reversible function 248 is contemplated.

To enable verification of the programmable part 244_1 of the stream identifier 244, in one aspect a cryptographic hash 250 is applied to the programmable part 244_1 of the stream identifier 244, generating a digest 252. In another aspect, the cryptographic hash 250 is applied to the programmable part 244_1 of the stream identifier 244 together with the entropy 240_2, generating the digest 252. In yet another aspect, depicted in FIG. 2, the cryptographic hash 250 is applied to, the P_Key 242, the entropy 240_2, and the programmable part 244_1 of the stream identifier 244, generating the digest 252.

The hypervisor 206 then combines the encrypted stream identifier 244_2 with the digest 252 in a combiner 254 to produce the R_Key 246 that is passed to the software layers implementing the RoCE protocols (not shown) in accordance with the Infiniband specification that insert the R_Key 246 and the P_Key 242 into appropriate fields of the RoCE request packet (not shown).

The RoCE request packet is transmitted to a receiving entity, i.e., a VNIC at a local or a remote machine (not shown) that processes the RoCE request packet in accordance with the Infiniband specification, and recovers the R_Key. The receiving entity then uses the R_Key in assembling RoCE packets to be transmitted back to the originating machine (not shown).

Figure 3:
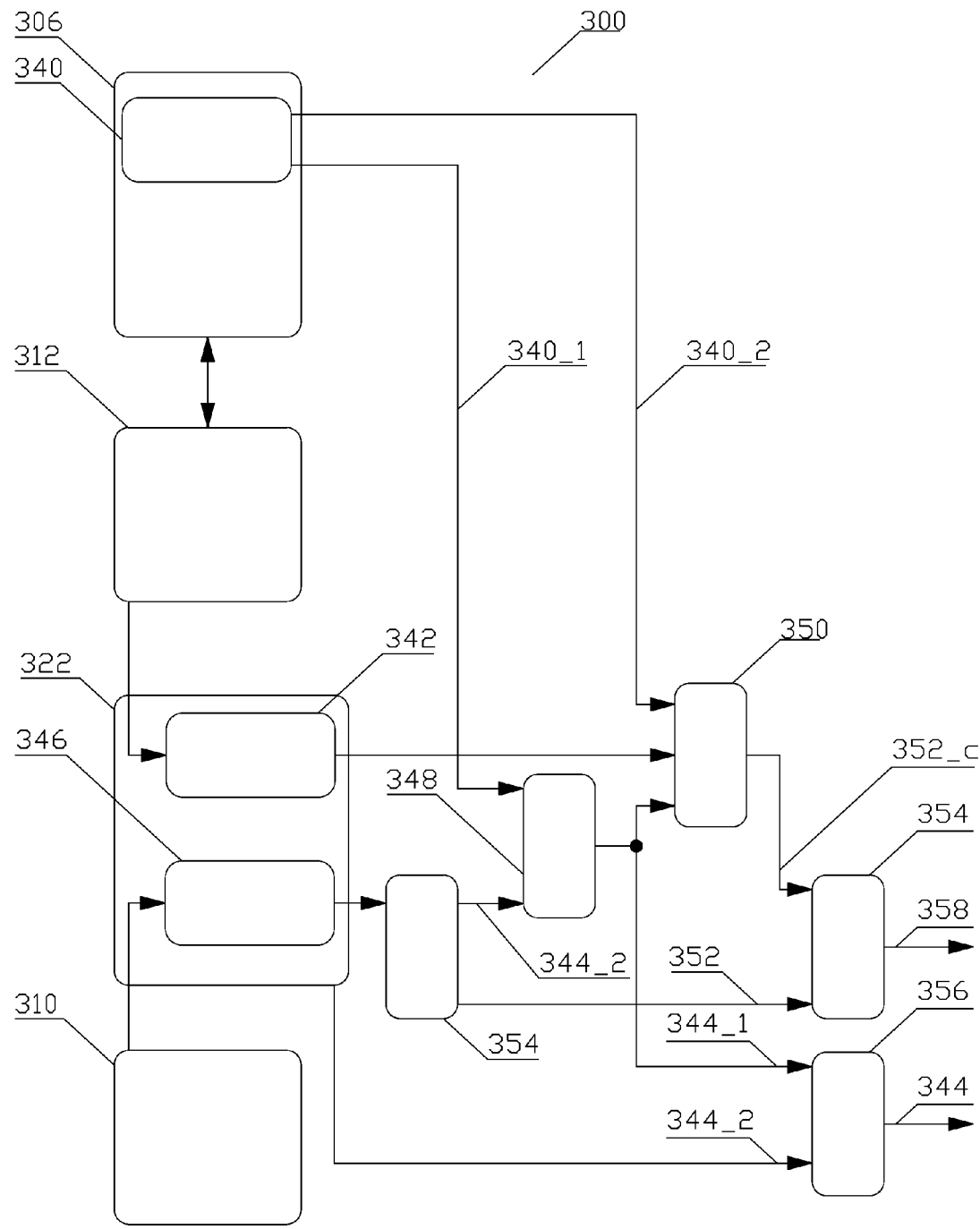
FIG. 3 depicts a conceptual structure and information flow enabling the process of reconstructing and validating a stream identifier from the opaque data.

Referring now to FIG. 3, a structure and information flow 300 enabling the process of recovering a stream identifier from an R_Key is described. A RoCE packet is received by a NIC 310 from a sending entity, e.g., an application at a remote or a local machine (not shown). In an aspect, the RoCE packet sent from a sending entity at a local machine is received via a virtual switch; consequently, the NIC 310 is not involved. The RoCE packet is processed e.g., parsed, validated, in accordance with the Infiniband specification, and based on the information in a header of the parsed RoCE packet, a hypervisor 306 via a virtual machine 312 assigns a VNIC 322 to further RoCE packet processing. The RoCE packet is provided by the NIC 310 to the assigned VNIC 322. The RoCE packet is further processed by the VNIC 322 in accordance with the Infiniband specification until the R_Key 346 is recovered.

The VNIC 322 separates the received R_Key 346 into an encrypted stream identifier 344_2 and a digest 352 using a splitter 354. The splitter 354 implements a reverse function to the function of the combiner 254 of FIG. 2.

The entity possessing the secret 340 provides the secret key 340_1, and the programmable portion 344_1 of the stream identifier 344 is decrypted from the encrypted stream identifier 344_2 and the secret key 340_1 using a function 348. Although a hypervisor 306 is depicted as possessing the secret key 340_1, in another aspect the secret key 340_1 is known to the hypervisor 306, the virtual machine 312, the NIC 310, and the VNIC 322; consequently any of the named entities may provide the secret key 340_1. The function 348 carries out reverse operation of the function 248 as disclosed in FIG. 2 and associated text. In an aspect, the function 348 comprises an XOR function.

To verify that the programmable portion 344_1 of the stream identifier 344 has not been tampered with, in one aspect, a cryptographic hash 350 generates a digest 350_c from the programmable portion 344_1 of the stream identifier 344.

In another aspect, the cryptographic hash 350 generates a digest 350_c from the programmable part 344_1 of the stream identifier 344 and at least one additional random data. The additional random data comprise the entropy 340_2 portion of the secret 340.

In yet another aspect, the additional random data comprise the entropy 340_2 portion of the secret 340 and the P_Key 342.

The computed digest 352_c is compared by comparator 354 with the digest 352. If the computed digests 352_c and the digest 352 match, the verification that the R-Key has not been tampered with is successful. Consequently, the programmable portion 344_1 of the stream identifier 344 is combined by combiner 356 with a static portion 344_2 of the stream identifier 344 provided by the VNIC 322 and passed to the SMMU (not shown); otherwise, a fault indication 358 is generated.

The fault indication 358 is reported to the VNIC 322 that may elect from several actions, i.e., drop the packet, increment a hypervisor drop statistic, increment a virtual machine drop statistic, cause a hypervisor interrupt, cause an interrupt at the software entity 116, for which the packet is intended, create an event indicating the error, or any permutation of the above. Additionally, if the NIC 310 is equipped with the ability to log information about the address that caused the fault recorded by the VNIC when the fault indication was detected, in some cases it is possible for the hypervisor to correct the error (such as bringing a page into memory) then asking the virtual to retry the operation from the point where the fault occurred.

Figure 4:
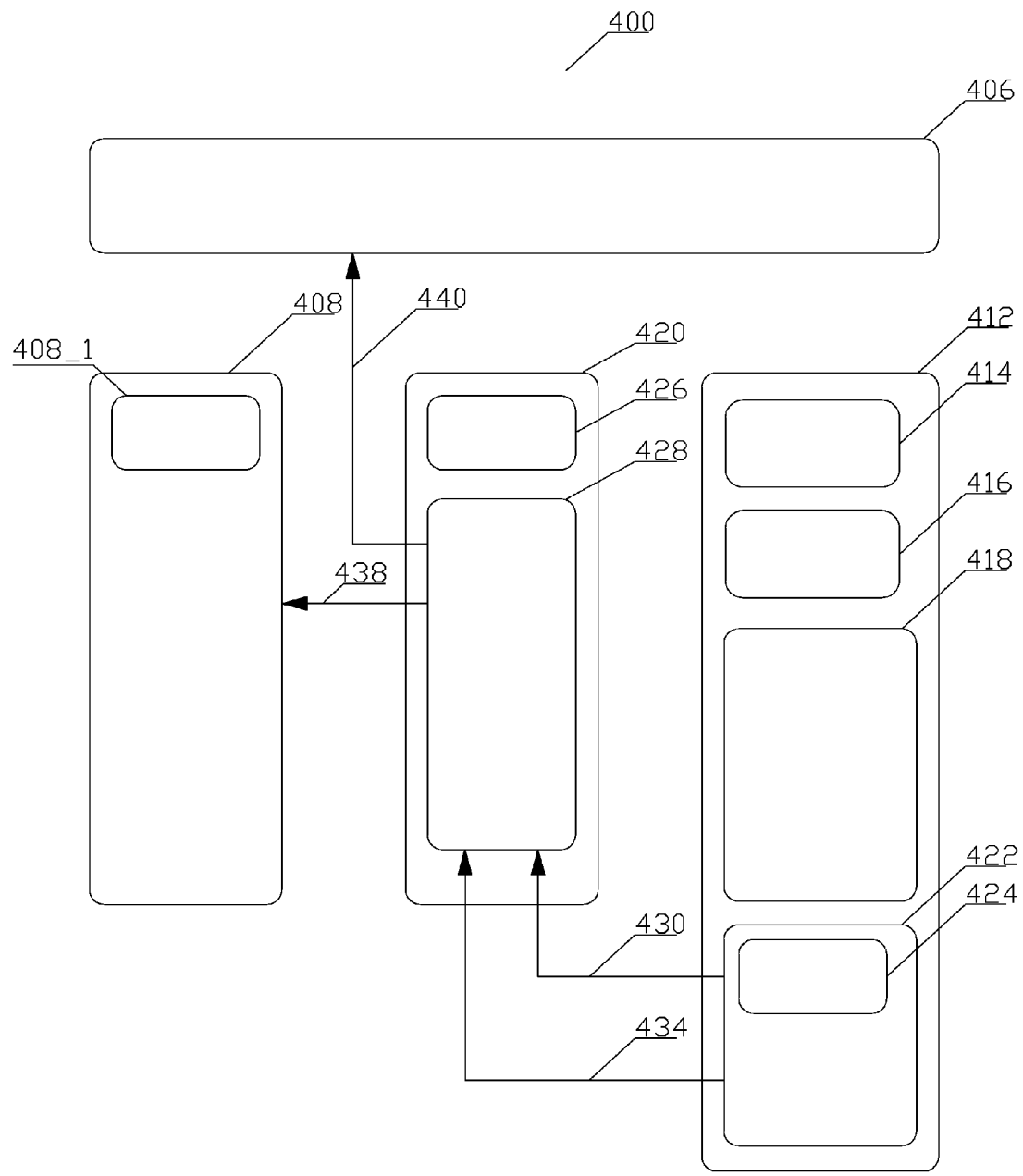
FIG. 4 depict a more detailed conceptual structure of the virtualization system of FIG. 1 and information flow enabling the process of address translation and verification for Remote Direct Memory Access carried out by a System Memory Management Unit.

FIG. 4 depicts a more detailed conceptual structure of the virtualization system 400 and information flow enabling the process of address translation and verification for RDMA carried out by a System Memory Management Unit (SMMU).

Each of the virtual machines 412 operates a software entity 416. The software entity 416 may comprise at least one application, alternatively, the software entity may comprise an operating system that operates the at least one application. Each of the virtual machines 412 may operates a different instance of the same software entity 416; alternatively, at least one virtual machine 412 may operates a different software entity 416.

A hypervisor 406, each virtual machine 412 and optionally each software entity 416 is further provided with a virtual memory 418. The virtual memory 418 may further be divided into a plurality of regions (not shown) allocated to different entities, i.e., the hypervisor, the VNIC(s), the application(s), and other entities known to persons of ordinary skills in the art. The virtual memory 418 accesses the storage 408 on the host machine via a System Memory Management Unit (SMMU) 420.

Each virtual machine 412 is provided with a virtual network interface card (VNIC) 422 to enable communication with another virtual machine 412 via a virtual switch (not shown). The virtual switch may be implemented in the hypervisor 406 or in a NIC (not shown), as well known to a person skilled in the art. The disclosure is agnostic to a specific implementation. Additionally, the VNIC 422 further enables each virtual machine 412 to communicate with a different remote machine via the virtual switch and the NIC.

The hypervisor 406 initiates structures that configure an operation of the virtual machine 412, i.e., the structure 414, the NIC, a VNIC 422, i.e., structure 424, as well as structure 426 configuring an operation of the SMMU 420. Structure 426 set an Address Translation Map (ATM) 428 to translate addresses between the virtual memory 418 and the storage 408.

A RoCE packet comprising a remote key (R_Key) generated in accordance with the aspects disclosed supra, is received by a NIC from a sending entity, e.g., an application at a remote or a local machine (not shown). In some aspects, the RoCE packet sent from a sending entity is received via a virtual switch (not shown); consequently, the NIC is not involved. The RoCE packet is processed e.g., parsed, validated, in accordance with the Infiniband specification, and based on the information in a header of the parsed RoCE packet, a hypervisor 406 via a virtual machine 412 assigns a VNIC 422 to additional RoCE packet processing. The RoCE packet is provided by the NIC to the assigned VNIC 422. The RoCE packet is further processed by the VNIC 422 in accordance with the Infiniband specification until the R_Key is recovered.

A stream identifier 430 is reconstructed from the R_Key and verified in accordance with the aspects disclosed supra. If the verification succeeded, the stream identifier 430 is provided without any additional processing together with a virtual address 434 obtained by the VNIC 422 from the RoCE packet to the SMMU 420 for address translation by the Address Translation Map 428.

The address translation map 428, comprising a structure defining mapping of the stream identifier 430 and virtual address 434 to allowed address regions of the memory space of the storage 408, translates the virtual address 434 into a physical address 438.

The VNIC 422 ascertains whether the address translation resulted in an allowed physical address 438 or an error occurred, e.g., by the translation resulting in a physical address 438 in a memory space of the storage, which is not RoCE RDMA permitted region. In the latter case, a fault indication 440 is generated.

The novel use of R_Key as a stream identifier disclosed supra, enables elimination of a look-up table, which defined RoCE RDMA permitted regions of the physical memory; therefore, preventing data corruption, consequently a different method of ascertaining permitted regions is needed.

Before writing the RoCE packet payload into the physical memory, the VNIC 422 must ascertain that the entire payload can be written to the physical memory, without causing data corruption or only part of the payload being written. Therefore, an ending physical address must be determined to ascertain that the entire range of physical addresses between the starting address 438 and the ending address are allowed, and thus the RoCE packet data can be written into the physical memory.

Consequently, the VNIC 438 computes the ending physical address by taking the starting physical address 438, adding the length of the RoCE payload and subtracting one. Because the physical memory is divided into pages, i.e., fixed-length contiguous block comprising the smallest unit of data for memory allocation, the starting address is translated into a starting page and the ending address is translated into an ending page. Such a translation depends on a size of a page as known to persons of ordinary skills in the art.

Before the payload may be written, each of the pages between and including the page identified by the start address 438 and the page identified by the computed ending address must be tested for access permission.

In an aspect, a storage controller 408_1 tests an access to each of the pages by carrying a pre-fetch, i.e., requesting access to a page in a memory data from memory in advance of the actual operation on the payload. If the pre-fetch fails for any of the pages, the entire RoCE packet is discarded and a fault indication 440 is generated.

The fault indication 440 is generated and reported to the VNIC 422 that may elect from several actions, i.e., drop the packet, increment a hypervisor drop statistic, increment a guest drop statistic, cause a hypervisor interrupt, cause an interrupt at the software entity for which the packet is intended, create an event indicating the error, or any permutation of the above. Additionally, if the NIC is equipped with the ability to log information about the address that caused the fault recorded by the VNIC when the fault indication was detected, in some cases it is possible for the hypervisor to correct the error (such as bringing a page into memory) then asking the virtual machine to retry the operation from the point where the fault occurred.

The various aspects of this disclosure are provided to enable one of ordinary skill in the art to practice the present invention. Modifications to various aspects of a presented throughout this disclosure will be readily apparent to those skilled in the art, and the concepts disclosed herein may be extended to other applications. Thus, the present invention is not intended to be limited to the aspects shown herein but is to be accorded the widest scope consistent with the principles and novel features disclosed herein.

Therefore, although the disclosure references an Infiniband specification, and more particularly the Infiniband specification as applied to Remote Direct Memory Access over Converged Ethernet, such was done merely to explain the concepts in regards to an exemplary aspect. A person of ordinary skills in the art will understand that the concept of generating and verifying a stream identifier may be applied to any application, where a mandatory data filed, containing opaque, arbitrary, but unique data—akin to the remote key— is included in a packet transmitted from one entity to another entity. As disclosed supra, cf. at least paragraph[0024], the opaque, randomly generated data may be generated in a deterministic manner as disclosed. All structural and functional equivalents to the various illustrative logical blocks, modules, circuits, and algorithm steps described in connection with the various aspects described throughout this disclosure that are known or later come to be known to those of ordinary skill in the art are expressly incorporated herein by reference and are intended to be encompassed by the claims. Such illustrative logical blocks, modules, circuits, and algorithm steps may be implemented as electronic hardware, computer software, or combinations of both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for remote direct memory access, comprising:
generating a remote direct memory access packet comprising an opaque data comprising an encrypted stream identifier and a digest, a virtual address, and a payload at a local machine;
receiving the remote direct memory access packet at a virtual network interface card on the local machine;
reconstructing a stream identifier by separating the opaque data into the encrypted stream identifier and the digest;
decrypting the encrypted stream identifier;
verifying the decrypted stream identifier using the first digest;
providing the verified stream identifier to a system memory management unit; and
mapping the virtual address and the provided stream identifier by the system memory management unit to a physical address, into which to write the payload.

2. The method as claimed in claim 1, wherein providing the verified stream identifier to the system memory management unit comprises:
providing the verified stream identifier to the system memory management unit without any further stream identifier processing.

3. The method as claimed in claim 1, further comprising:
determining a starting page in a memory in accordance with the physical address;
determining an ending page in the memory in accordance with the physical address and size of the payload;
testing each page between the starting page and the ending page, including the starting and the ending page, for access permission; and
writing the payload into the memory if the testing is positive for all the pages.

4. The method as claimed in claim 3, further comprising:
discarding the remote direct memory access packet if the testing is negative for at least one of the pages.

5. The method as claimed in claim 3, wherein the determining an ending page in the memory in accordance with the physical address and size of payload in the remote direct memory access packet comprises:
computing an ending address by adding a size of the payload to the starting address and subtracting number one; and
converting the ending address to the ending page in accordance with the size of a page in the memory.

6. The method as claimed in claim 3, wherein the testing each page comprises:
requesting access to each of the intervening pages in advance of the writing of the payload.

7. An apparatus for remote direct memory access, comprising:
A local machine comprising a virtual network interface card, configured:
to receive a remote direct memory access packet comprising an opaque data comprising an encrypted stream identifier and a digest, a virtual address, and a payload, generated by the local machine,
to reconstruct a stream identifier by separating the opaque data into an encrypted stream identifier and the digest,
to decrypt the encrypted stream identifier;
to verify the decrypted stream identifier using the digest, and
to provide the verified stream identifier to a system memory management unit;
and the system memory management unit communicatively coupled to the virtual network interface card configured to map the virtual address and the stream identifier to a physical address, into which to write the payload.

8. The apparatus as claimed in claim 7, wherein the virtual network interface card is configured to provide the verified stream identifier to the system memory management unit without any further stream identifier processing.

9. The apparatus as claimed in claim 7, wherein the virtual network interface card further configured to
determine a starting page in a memory in accordance with the physical address, and
determine an ending page in the memory in accordance with the physical address and size of the payload; and
wherein the apparatus further comprises a memory controller communicatively coupled to the system memory management unit, the memory controller being configured to
test each page between the starting page and the ending page, including the starting and the ending page, for access permission; and write the payload into the memory if the testing is positive for all the pages.

10. The apparatus as claimed in claim 9, wherein the memory controller is further configured to discard the remote direct memory access packet if the testing is negative for at least one of the pages.

11. The apparatus as claimed in claim 9, wherein the memory controller determines an ending page in the memory by being configured to:
   compute an ending address by adding a size of the payload to the starting address and subtracting number one; and
   convert the ending address to the ending page in accordance with the size of a page in the memory.

12. The apparatus as claimed in claim 9, wherein the memory controller tests each intervening page by being configured to:
   request access to each of the pages in advance of the writing of the payload.

* * * * *